United States Patent
Stefanov

(10) Patent No.: US 10,424,085 B2
(45) Date of Patent: Sep. 24, 2019

(54) SYSTEMS AND METHODS FOR APPROXIMATING AN IMAGE

(71) Applicant: Facebook, Inc., Menlo Park, CA (US)

(72) Inventor: Stoyan N. Stefanov, Los Angeles, CA (US)

(73) Assignee: Facebook, Inc., Menlo Park, CA (US)

( * ) Notice: Subject to any disclaimer, the term of this patent is extended or adjusted under 35 U.S.C. 154(b) by 34 days.

(21) Appl. No.: 15/721,392

(22) Filed: Sep. 29, 2017

(65) Prior Publication Data
US 2019/0102914 A1   Apr. 4, 2019

(51) Int. Cl.
*G06T 11/00*   (2006.01)
*G06T 7/90*   (2017.01)
*G06T 7/11*   (2017.01)

(52) U.S. Cl.
CPC .............. *G06T 11/001* (2013.01); *G06T 7/11* (2017.01); *G06T 7/90* (2017.01); *G06T 2207/10024* (2013.01); *G06T 2207/20021* (2013.01); *G06T 2207/30176* (2013.01)

(58) Field of Classification Search
None
See application file for complete search history.

(56) References Cited

PUBLICATIONS

Stoyan Stefanov; https://mobile.twitter.com/stoyanstefanov/status/824139398094659584; Jan. 24, 2017.
Ben Howdle; Grade.js; http://benhowdle.im/grade; as accessed Aug. 5, 2017.
Ben Howdle; Grade.js; https://github.com/benhowdle89/grade; as accessed Aug. 5, 2017 (dated Sep. 21, 2016).
Generate the Dominant Colors for an RGB image with XMLHttpRequest; https://stackoverflow.com/questions/33312362/generate-the-dominant-colors-for-an-rgb-image-with-xmlhttprequest/33792749; as accessed Aug. 5, 2017 (dated May 23, 2017).
Nick Rabinowitz; quantize.js; https://gist.github.com/nrabinowitz/1104622; as accessed Aug. 5, 2017 (dated Jul. 25, 2011).

*Primary Examiner* — Michelle Chin
(74) *Attorney, Agent, or Firm* — FisherBroyles, LLP

(57) ABSTRACT

A computer-implemented method for approximating an image may include (i) dividing an original image into a plurality of approximation sectors, (ii) calculating a representative color for each approximation sector, (iii) selecting, based on the representative color of each approximation sector, at least one color gradient and a direction for each color gradient, such that the color gradients form a visual approximation of the original image, and (iv) providing, to an endpoint computing device and based on the selected color gradients, instructions that enable the endpoint computing device to render, prior to displaying the original image, the visual approximation of the original image. Various other methods, systems, and computer-readable media are also disclosed.

20 Claims, 9 Drawing Sheets
(4 of 9 Drawing Sheet(s) Filed in Color)

SYSTEMS AND METHODS FOR APPROXIMATING AN IMAGE

BACKGROUND

Advertisers, bloggers, and other individuals and organizations that provide digital content generally seek ways to engage users' attention. Content providers may seek to capture users' attention by displaying images on a webpage. Users may then feel prompted to interact with the image and/or other content associated with the image.

Unfortunately, users' computing devices may be subject to conditions that cause images to load slowly. For example, mobile devices (e.g., mobile phones and/or tablets) may have access to limited bandwidth, thereby impeding the transfer of image data. Likewise, a spike in network traffic may reduce the responsiveness of a server, which may delay the transmission of image data. Content providers may nevertheless attempt to capture user attention by providing some sort of indication that an image will be displayed. For example, content providers may place alternate text within an image frame to provide a brief description of the image that will ultimately appear within the image frame. However, traditional placeholders may appear out of place, may signal to the user that content is failing to load, and/or may otherwise fail to engage the user. Accordingly, a user may lose patience with slow-loading content rather than waiting for the image to load. The instant disclosure, therefore, identifies and addresses a need for improved systems and methods for approximating an image.

SUMMARY

As will be described in greater detail below, the instant disclosure describes various systems and methods for approximating an original image by generating a set of instructions based on a visual analysis of the original image. In one example, a method for approximating an image may include (i) dividing an original image into a collection of approximation sectors, (ii) calculating a representative color for each approximation sector in the plurality of approximation sectors, (iii) selecting, based on the representative color of each approximation sector in the plurality of approximation sectors, at least one color gradient and a direction of the color gradient(s), wherein the color gradient(s) form a visual approximation of the original image, and (iv) providing, to an endpoint computing device and based on the color gradient(s) and the direction of the color gradient(s), instructions that enable the endpoint computing device to render, prior to displaying the original image, the visual approximation of the original image. In some examples, these instructions may be provided to the endpoint computing device prior to providing the original image to the endpoint computing device.

The above-described method may divide the original image into approximation sectors in any of a variety of ways. For example, dividing the original image may include dividing the original image according to a predetermined grid and/or layout of approximation sectors. Additionally or alternatively, dividing the original image may include performing a visual analysis of the original image to identify key regions of the original image. The method may then utilize this visual analysis to divide the original image into approximation sectors based on the identified key regions of the original image.

In some embodiments, the instructions may include a set of computer-executable instructions. These computer-executable instructions may be written in a markup language, such as Cascading Style Sheets (CSS). In one example, the instructions may include a single set of computer-executable instructions that are provided to the endpoint computing device in response to a network request for the original instructions. This set of computer-executable instructions may enable the endpoint computing device to both (i) render the visual approximation of the original image before displaying the original image and (ii) display the original image after receiving the original image.

The method may include calculating representative colors for approximation sectors by processing the original image with an algorithm. In some examples, this algorithm may include a color quantization algorithm.

In some embodiments, selecting the color gradient(s) and the direction of the color gradient(s) may include selecting a corresponding color gradient and a direction of the corresponding color gradient for each approximation sector in the collection of approximation sectors. In these embodiments, selecting the corresponding color gradient may be based at least in part on the representative color of an adjacent approximation sector.

Furthermore, selecting a color gradient and the direction of the color gradient may include selecting the color gradient based on a pair of approximation sectors selected from the collection of approximation sectors. In these examples, the pair of color gradients may be selected based on a calculated difference between the representative colors of each approximation sector in the collection of approximation sectors.

In some examples, selecting the color gradient(s) may include selecting a shape of the color gradient. Examples of the shape of the color gradient may include a linear gradient, a radial gradient, a repeating linear gradient, and/or a repeating radial gradient.

In embodiments where at least two color gradients are selected, the method may provide the endpoint computing device with instructions that account for each selected color gradient. For example, providing the instructions to the endpoint computing device may include providing instructions that describe a blending pattern that combines the selected color gradients.

In addition, a corresponding system for approximating an image may include several modules stored in a memory of the system that are executed by at least one physical processor of the system. For example, the system may include (i) a dividing module, stored in the memory, that divides an original image into a collection of approximation sectors, (ii) a calculating module, stored in the memory, that calculates a representative color for each approximation sector in the collection of approximation sectors, (iii) a selecting module, stored in the memory, that selects, based on the representative color of each approximation sector in the collection of approximation sectors, at least one color gradient and a direction of the color gradient(s), wherein the color gradient(s) form a visual approximation of the original image, and (iv) a providing module, stored in the memory, that provides, to an endpoint computing device and based on the color gradient(s) and the direction of the color gradient(s), instructions that enable the endpoint computing device to render, prior to displaying the original image, the visual approximation of the original image.

In some examples, the above-described method may be encoded as computer-readable instructions on a computer-readable medium. For example, a computer-readable medium may include one or more computer-executable instructions that, when executed by at least one processor of a computing device, may cause the computing device to (i) divide an original image into a collection of approximation sectors, (ii) calculate a representative color for each approximation sector in the collection of approximation sectors, (iii) select, based on the representative color of each approximation sector in the collection of approximation sectors, at least one color gradient and a direction of the color gradient(s), wherein the color gradient(s) form a visual approximation of the original image, and (iv) provide, to an endpoint computing device and based on the color gradient(s) and the direction of the color gradient(s), instructions that enable the endpoint computing device to render, prior to displaying the original image, the visual approximation of the original image.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings illustrate a number of exemplary embodiments and are a part of the specification. Together with the following description, these drawings demonstrate and explain various principles of the instant disclosure.

Figure 1:
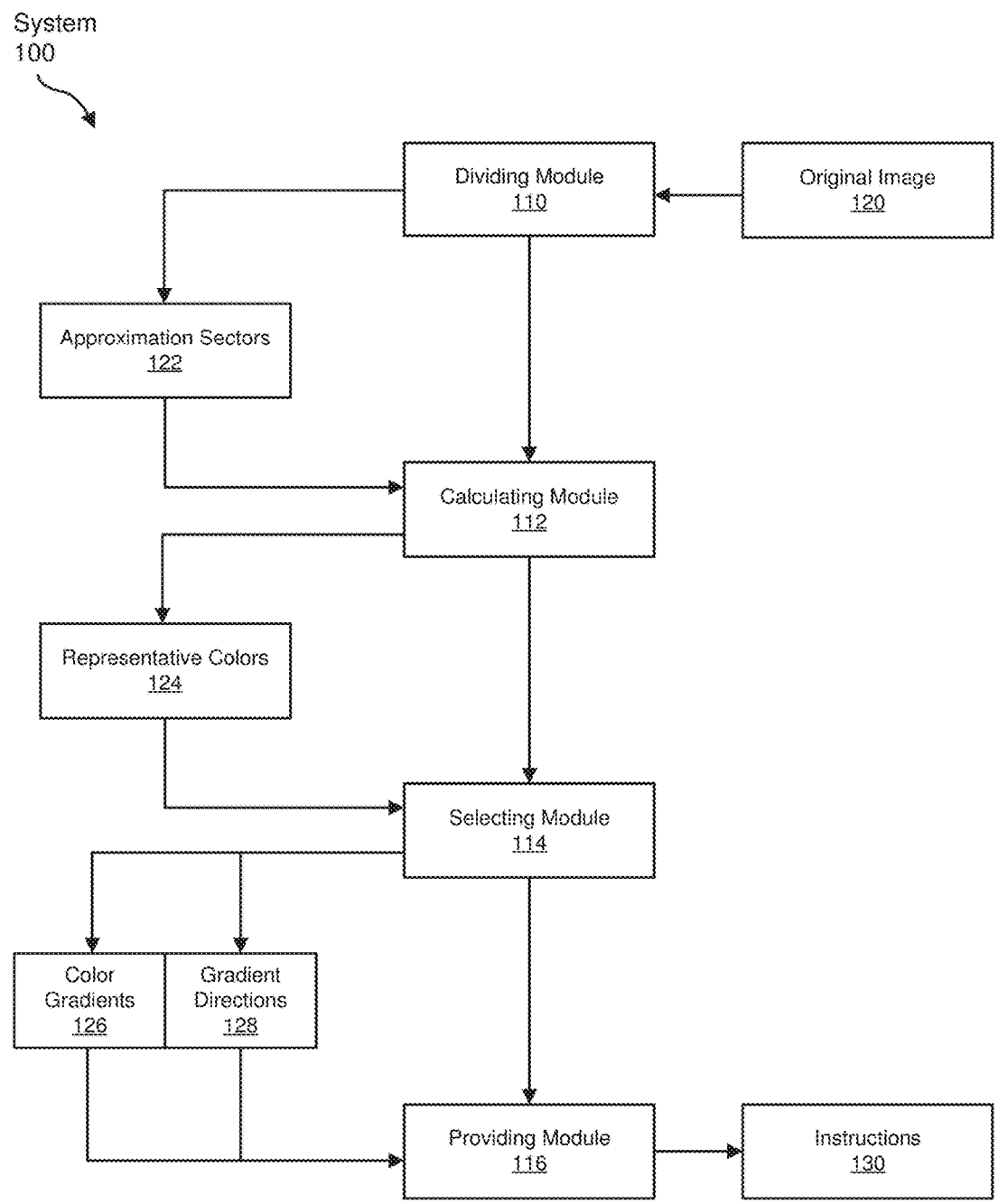
FIG. 1 is a block diagram of an example system for approximating an image.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for approximating an image. As will be explained in greater detail below, embodiments of the instant disclosure may analyze an image and generate a set of computer-executable instructions that can be used to render an approximation of the image at an endpoint computing device.

As a specific example, a backend computing system may, as will be described in greater detail below, generate a visual approximation of a particular image. This visual approximation may be represented by code written in a markup language (such as Cascading Style Sheets, or CSS) that is then embedded into webpages or other network communications that are used to display the particular image. When a computing device requests an image, a browser installed on the device may receive layout instructions and other markup data related to displaying the original image. The browser may be able to render and display the approximation image based on these instructions before the original image has finished loading, thereby providing the end user with information indicating that the full original image will soon be displayed. By enabling browsers and other applications to render representative previews of full images in this way, the systems and methods described herein may more readily capture user attention and improve user interaction with various digital environments.

The following will provide, with reference to FIG. 1, detailed descriptions of a system for approximating images. Detailed descriptions of an example method for approximating images will be provided in connection with FIG. 2. Descriptions of approximation sectors and approximation sector layouts will be provided in connection with FIGS. 3 and 4. Detailed descriptions of selecting representative colors for approximation sectors will be provided in connection with FIG. 5. Descriptions of gradients will be provided in connection with FIGS. 6 and 7. Detailed descriptions of a model system for providing instructions for rendering an approximation image will be provided in connection with FIG. 8, and detailed descriptions of a model browser window displaying approximation images will be provided in connection with FIG. 9.

FIG. 1 is a block diagram of an example system 100 for approximating an image. As illustrated in FIG. 1, system 100 may receive original image 120 as an input. A dividing module 110 may then divide original image 120 into approximation sectors 122. A calculating module 112 may calculate representative colors 124 of approximation sectors 122. A selecting module 114 may select color gradients 126 and gradient directions 128 based on representative colors 124. A providing module 116 may use color gradients 126 and gradient directions 128 to generate instructions 130 that an endpoint computing device may use to render an approximation of original image 120.

Original image 120 generally represents any type or form digital image and/or digital representation of visual information. Digital images may be stored as electronic files using a variety of formats, such as the Graphics Interchange Format (GIF), Joint Photographic Experts Group (JPEG), Tagged Image File Format (TIFF), bitmap (BMP), Portable Network Graphics (PNG), and/or any suitable format for storing image data. Digital images may be transferred over networks (e.g., as part of a web page). Furthermore, digital images may be rendered and/or displayed by a variety of software, including but not limited to web browsers (e.g., GOOGLE CHROME or MOZILLA FIREFOX).

The term "approximation sector" generally refers to a subsection of an image used as part of a visual analysis of the image. A collection of approximation sectors associated with an image may represent a collection of non-overlapping portions of the image (i.e., approximation sectors) that together cover the entire image. Approximation sectors may be used to generate a visual approximation of the image, as will be described in greater detail below.

Color gradients 126 generally represent ranges of colors applied across a region. Color gradients may progress in a particular direction. For example, color gradients 126 may be drawn in gradient directions 128. Furthermore, color gradients may have a shape. For example, a color gradient may be a linear gradient, a radial gradient, gradient meshes, or any other suitable shape of gradient. As a specific example, a two-color linear gradient may be illustrated as a gradual change from one color to the other color, as applied along a single axis. Similarly, a two-color radial gradient may be illustrated as a gradual change from one color at the center of a gradient to the other color at the periphery of the gradient. In some embodiments, gradients may include more than one color. In these embodiments, the gradient may include "stops" that represent a given color at a given position within the gradient. The gradient may then represent a gradual change of color from one stop to the next. For example, a three-color linear gradient applied over a rectangular area from left to right may include three stops of red, white, and blue. The gradient may thus be red at the leftmost edge of the rectangle, transition to white at the white "stop," and finally transition to blue at the rightmost edge of the rectangle. As will be described further below, gradients may be blended, shaped, and/or applied across an area in a variety of ways.

Some software and/or applications are capable of rendering gradients and/or images. Such software and/or applications may utilize computer-executable instructions, such as instructions 130, to render and/or display gradients and/or images. These instructions may provide a variety of information in addition to information on how to render a gradient. For example, the instructions may contain information describing a source for an image to be displayed, a layout for the image, a manner in which the image is to be displayed, and/or alternate images to be displayed in place of the image until the image is loaded. Instructions 130 may be written in a variety of languages and/or combination of languages, including markup languages. Examples of markup languages include, without limitation, HyperText Markup Language (HTML), Cascading Style Sheets (CSS), and Extensible Hypertext Markup Language (XHTML). Given that instructions written in a markup language may include instructions for retrieving and/or properly arranging an image for display, instructions 130 may be provided to an endpoint computing device to enable that computing device to load and properly display an image.

Instructions 130 may include instructions to display a visual approximation of an original image (or "approximation image") while the original image is loading. Moreover, the information needed for an endpoint computing device to render the approximation image may be entirely embedded within instructions 130. As such, an endpoint computing device may have the information required to render and display the approximation image before the original image has completed loading.

Figure 2:
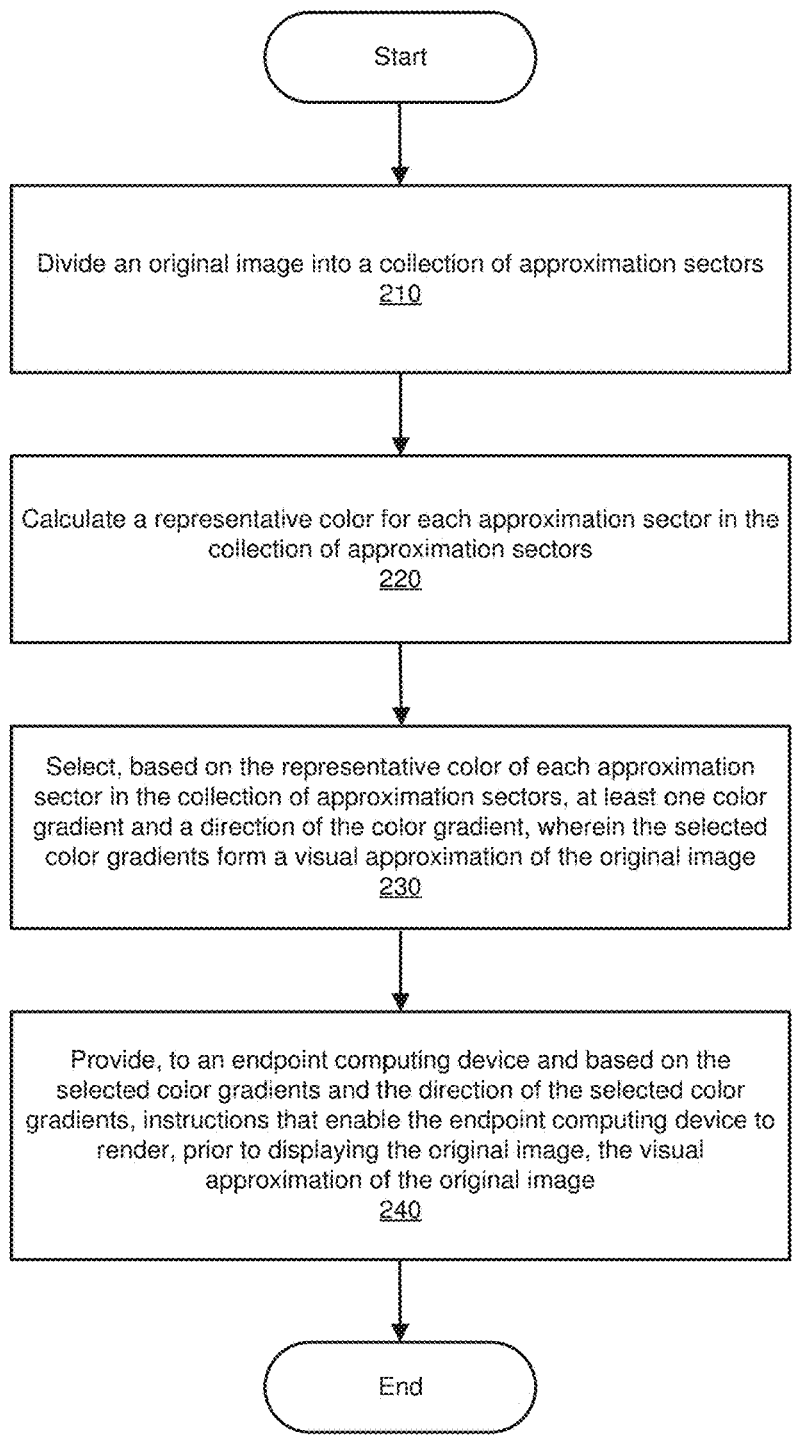
FIG. 2 is a flow diagram of an example method for approximating an image.

FIG. 2 is a flow diagram of an example method 200 for approximating an image. At step 210 of FIG. 2, the method may include dividing an original image into a collection of approximation sectors. For example, dividing module 110 may divide original image 120 into approximation sectors 122.

Dividing module 110 may divide original image 120 into approximation sectors in a variety of ways. In general, layouts of approximation sectors may follow certain rules regardless of the exact arrangement of approximation sectors. For example, the collection of approximation sectors may completely cover the area of original image 120 such that no approximation sector overlaps with another approximation sector. As an additional example of such a rule, dividing module 110 may attempt to ensure that each approximation sector covers roughly the same amount of area (e.g., 5 sectors would each cover 20%) of original image 120.

In some embodiments, dividing module 110 may divide original image 120 into approximation sectors according to a predetermined layout of approximation sectors. Such a predetermined layout or grid may be stored as a vector path, allowing the layout to be freely resized while maintaining the relative positions and proportions of the approximation sectors. By enabling the layout to be resized in this manner, a rectangular layout of approximation sectors may be resized to cover any arbitrarily sized rectangular original image. Similarly, an oval predetermined layout may be resized to cover any arbitrarily oval-shaped original image.

In general, such a predetermined layout of approximation sectors may divide original image 120 into roughly equal parts distributed evenly across the area of original image 120. Dividing module 110 may use the same predetermined layout for all images processed by dividing module 110, scaling the predetermined layout as necessary to ensure that all of original image 120 is accounted for, as described above. Additionally or alternatively, dividing module 110 may maintain a database of approximation layouts that are each suitable for dividing different types of original images. For example, dividing module 110 may maintain a database with predetermined layouts for large rectangular images, medium-sized rectangular images, small rectangular images, and oval-shaped images. Each layout may contain a different number and/or arrangement of approximation sectors to ensure that other elements of the systems and methods described herein have sufficient information to create an appropriate visual approximation of original image 120. In these embodiments, dividing module 110 may retrieve and apply a suitable predetermined layout based on metadata about original image 120. For example, dividing module 110 may evaluate shape metadata, aspect ratio metadata, and/or any other suitable information about original image 120. Dividing module 110 may then compare the evaluated metadata about original image 120 to aspects of the predetermined layouts stored in the database. Additionally or alternatively, dividing module 110 may maintain a database that is populated with various layouts of approximation sectors. For example, the database may contain approximation sector layouts containing varying numbers of approximation sectors. A user may then configure dividing module 110 to use layouts with specific numbers of approximation sectors for different types of images. As a specific example, a user may configure dividing module 110 to use a layout with four approximation sectors when processing images that will be displayed at low resolution to end users, but use layouts with six approximation sectors when processing images that will be displayed at higher resolutions to end users.

Figure 3:
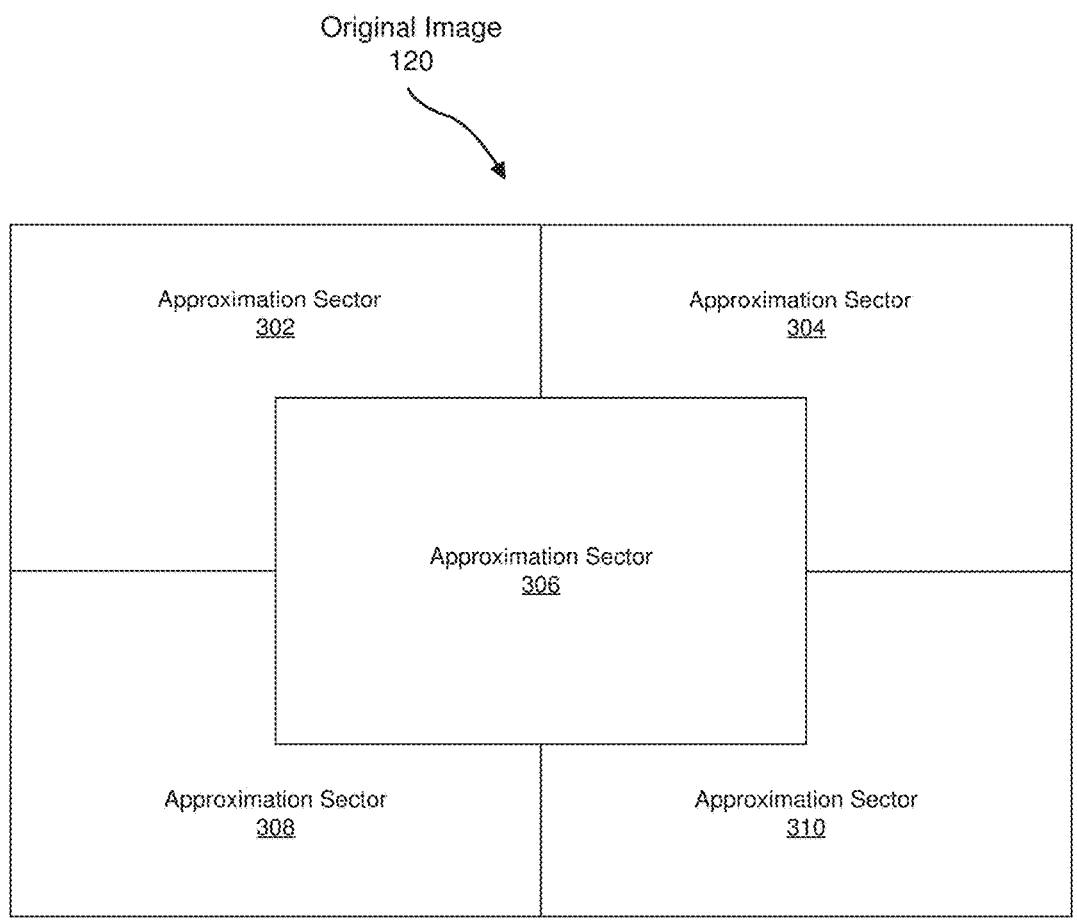
FIG. 3 is a schematic diagram of an example preset grid for dividing an original image into approximation sectors.

An example of original image 120 divided into approximation sectors according to a predetermined grid is illustrated in FIG. 3. As shown in FIG. 3, dividing module 110 may divide original image 120 into five regions, illustrated as approximation sectors 302, 304, 306, 308, and 310. These regions are laid out in a particular arrangement. In the example of FIG. 3, approximation sector 302 covers the upper left region of original image 120, approximation sector 304 covers the upper right region of original image 120, approximation sector 308 covers the lower left region of original image 120, approximation sector 310 covers the lower right region of original image 120, and approximation sector 306 covers the center region of original image 120. As shown in FIG. 3, the approximation sectors do not overlap with one another, but still cover the entirety of original image 120. As may be appreciated from the preceding descriptions, this grid layout may be resized and/or reshaped to cover any substantially rectangular original image to ensure that the entire original image is covered by the grid of approximation sectors. Furthermore, although FIG. 3 shows a square grid composed of five approximation sectors, a predetermined grid may contain any number of sectors in any suitable arrangement to, for example, maintain the quality of the approximation image and/or ensure that endpoint computing devices will be able to quickly render the approximation image.

In further embodiments, dividing module 110 may dynamically generate a layout of approximation sectors based on the size, shape, color variation, and/or any other suitable feature of original image 120. Additionally or alternatively, dividing module 110 may account for user-defined parameters, such as a number of approximation sectors that should be applied across an image. In one example of such embodiments, an administrator may configure dividing module 110 to divide circular images into a number of approximation sectors based on the size of the image. As a specific example, dividing module 110 may divide a particular circular image into five equally-sized sectors based on the size of the image. Dividing module 110 may then receive a circle-shaped image to be divided into approximation sectors. Dividing module 110 may divide this image into approximation sectors by segmenting the circle along five radii each covering an equal sweep of the circle, resulting in five approximation sectors covering five equally sized sectors of the circle.

In some examples, dividing module 110 may perform a visual analysis of the original image to identify key regions of the original image, such as faces, large blocks of color, distinct shapes, or other features that might be useful in generating a visual approximation of original image 120. Dividing module 110 may then divide original image 120 into approximation sectors based on these identified key regions. Dividing module 110 may use a variety of algorithms and/or techniques to determine regions, such as edge tracing, color similarity, and/or any other suitable image segmentation process.

Figure 4:
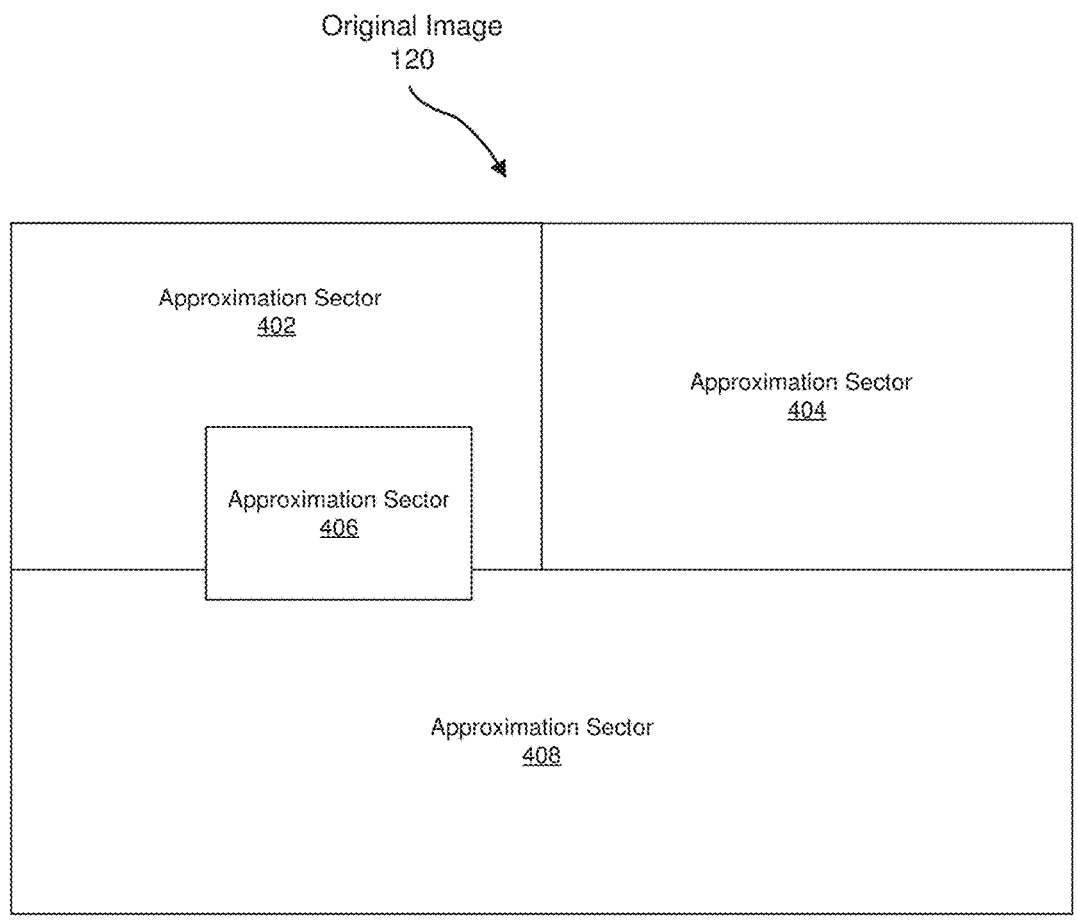
FIG. 4 is a schematic diagram of an example original image divided into approximation sectors based on a visual analysis of the original image.

An illustrated example result of such an analysis and subsequent division into approximation sectors is shown in FIG. 4. As shown in FIG. 4, dividing module 110 may have identified four key regions of original image 120, and accordingly divided original image 120 into approximation sectors 402, 404, 406, and 408 based on the locations and sizes of these regions. As a specific example, original image 120 may be a landscape photo of a forest. The lower half of original image 120 may be filled with dark green trees. Given that this entire area may be filled with approximately the same color, dividing module 110 may segment that region into an approximation sector (i.e., approximation sector 408). Similarly, approximation sector 402 may cover a region of a tree in the foreground, approximation sector 404 may cover an area generally filled with blue sky, and approximation sector 406 may cover a region containing grey boulder.

Once dividing module 110 has divided an original image into approximation sectors, other modules may select representative colors for each approximation sector. At step 220 in FIG. 2, the method may include calculating a representative color for each approximation sector in the collection of approximation sectors. For example, calculating module 112 may calculate representative colors 124 for approximation sectors 122.

In general, calculating module 112 may calculate a representative color for an approximation sector based on the pixels of original image 120 that correspond to the region covered by the approximation sector. Calculating module 112 may apply any suitable mathematical technique, algorithm, method, etc. for determining the representative color of an approximation sector. As a specific example, calculating module 112 may select the median color of an approximation sector as the representative color for that approximation sector.

Calculating module 112 may also combine various techniques when calculating a representative color for an approximation sector. For example, calculating module 112 may pre-process original image 120 with one algorithm before calculating representative colors for approximation sectors with a second algorithm. In one embodiment, calculating module 112 may process original image 120 with a color quantization algorithm to ensure that the ultimately selected color serves as a good indicator for the overall color of that approximation sector. A color quantization algorithm is generally used to reduce the number of distinct colors in an image while ensuring that the processed image is still sufficiently similar to the original image. Calculating module 112 may thereby reduce the colors in original image 120 to a select palette of colors, and then calculate representative colors for each approximation sector based on the image that uses the restricted palette. For example, calculating module 112 may apply a color quantization algorithm to reduce a 256-color original image of a forest landscape down to a restricted palette of 12 colors before calculating the median color of each approximation sector. In this manner, calculating module 112 may efficiently and accurately calculate representative colors for approximation sectors even when processing complex images.

Calculating module 112 may additionally or alternatively disregard certain portions of an original image when calculating representative colors for approximation sectors. In certain embodiments, calculating module 112 may be configured to disregard or ignore specific colors and/or color ranges. For example, a user may configure calculating module 112 to ignore black pixels and white pixels when processing an image to ensure that text overlaid onto an image of a landscape (i.e., an image that is unlikely to contain purely black or white regions) does not affect the representative colors chosen for that image. Additionally or alternatively, calculating module 112 may analyze the original image and/or retrieve metadata describing the original image to determine that the image contains text and may, in response, exclude pixels contributing to the text when calculating representative colors for the approximation sectors.

Figure 5:
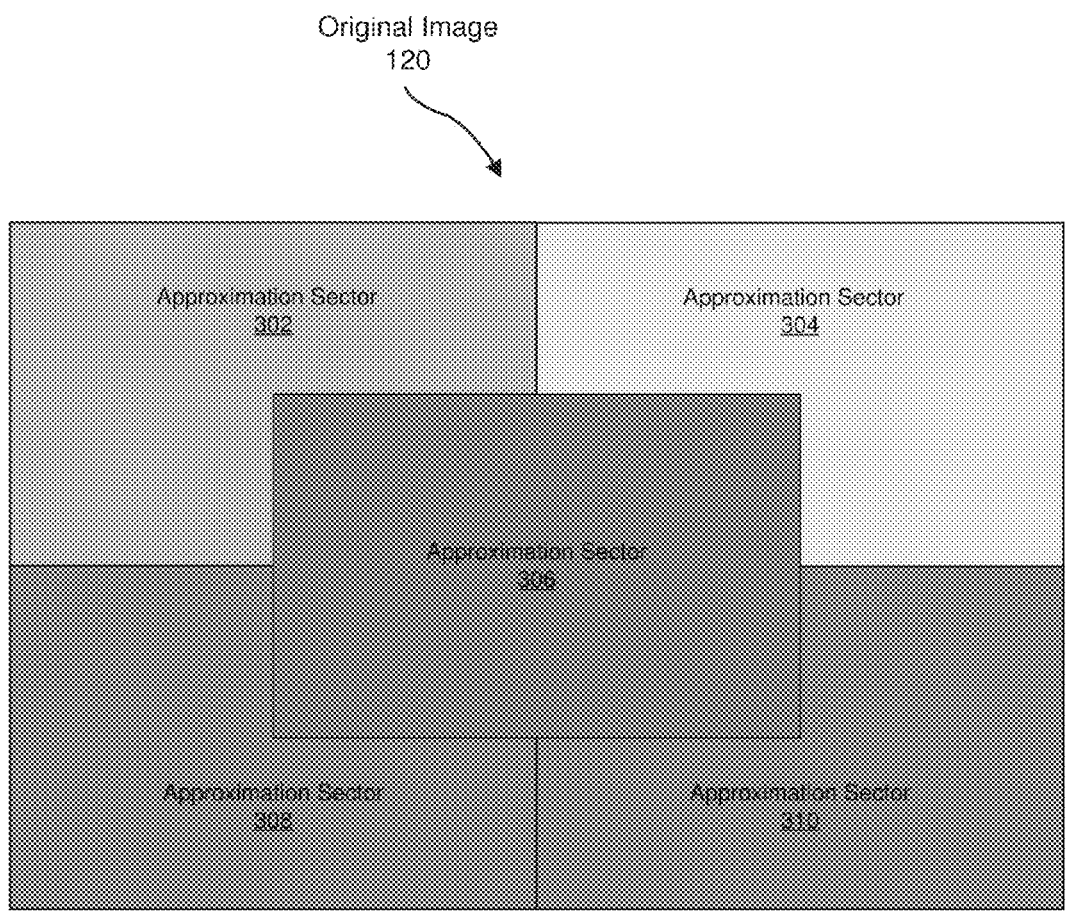
FIG. 5 is a schematic diagram of an example image divided into approximation sectors and filled with representative colors for each approximation sector.

An illustrated result of calculating representative colors of an image is provided in FIG. 5. As illustrated in the example of FIG. 5, dividing module 110 may have divided original image 120 into approximation sectors according to the predetermined layout shown in FIG. 3. As shown in FIG. 5, calculating module 112 may have calculated that pale green is the representative color for approximation sector 302, pale blue is the representative color for approximation sector 304, forest green is the representative color for approximation sector 306, and brown is the approximation color for both approximation sector 308 and approximation sector 310.

The systems and methods described herein may select gradients based on the calculated representative colors. At step 230 in FIG. 2, the method may include selecting, based on the representative color of each approximation sector in the collection of approximation sectors, at least one color gradient and a direction of the color gradient. For example, selecting module 114 may select color gradients 126 and gradient directions 128 based on representative colors 124 and the relative positions of approximation sectors 122. Color gradients 126 applied in gradient directions 128 may form a visual approximation of original image 120.

Selecting module 114 may select color gradients 126 and gradient directions 128 in a variety of ways. For example, selecting module 114 may select a single color gradient and a corresponding direction for that gradient based on a pair of approximation sectors selected from the approximation sectors 122. In one embodiment of this example, selecting module 114 may identify two approximation sectors in approximation sectors 122 that are the most different. This difference may be calculated in a variety of traditional ways. For example, selecting module 114 may select the pair of approximation sectors based on calculated differences between the representative colors of each approximation sector in approximation sectors 122. As a specific example and with returning reference to FIG. 3, selecting module 114 may calculate differences between the representative colors of each possible pair of approximation sectors for a total of ten comparisons. The two approximation sectors with the greatest difference in color may be selected as the basis for selecting a color gradient to serve as an approximation of original image 120. Selecting module 114 may then select a color gradient that transitions from the color in one approximation sector to the color of the other approximation sector, in a direction determined by the locations of those approximation sectors in the layout of approximation sectors.

Figure 6:
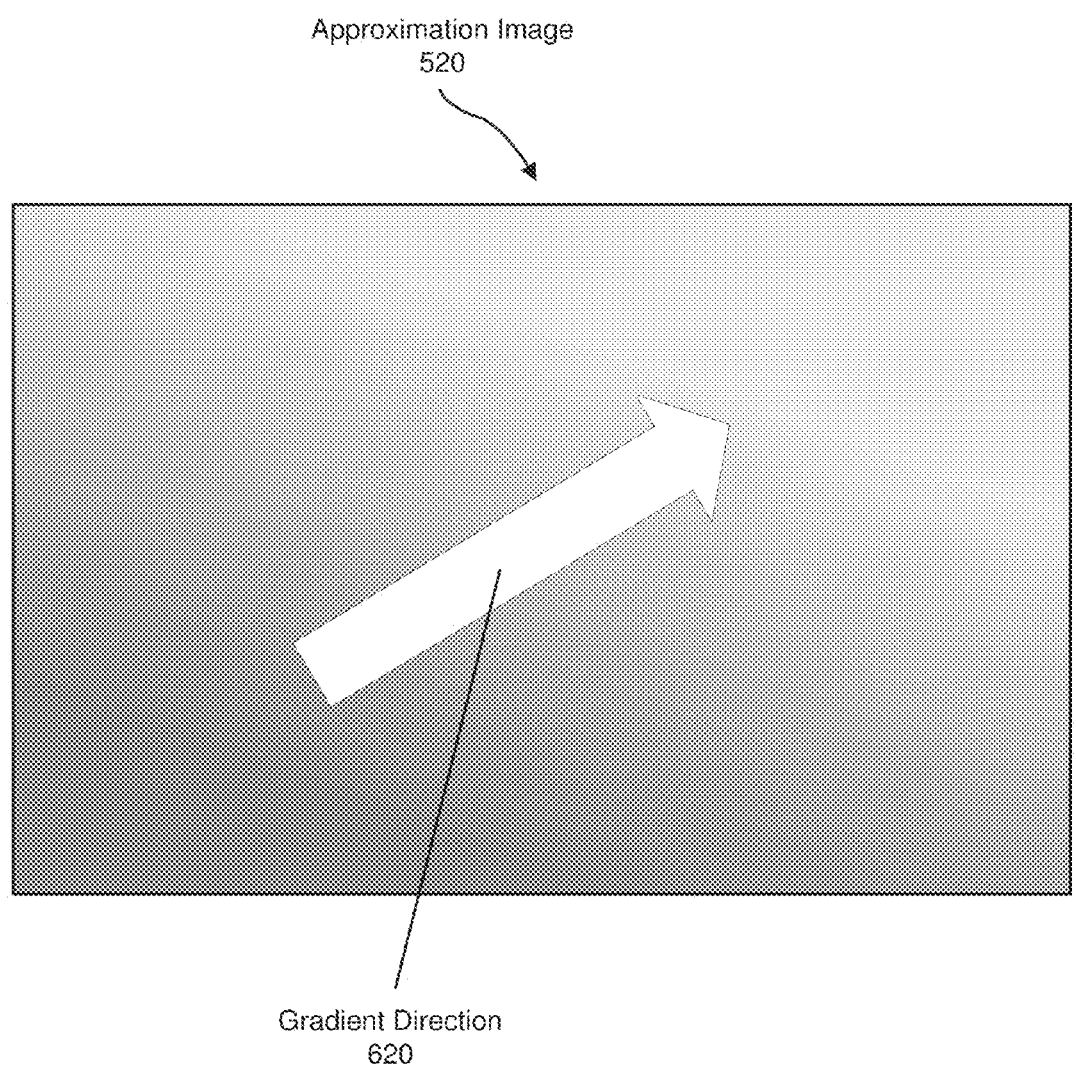
FIG. 6 is a diagram showing an example color gradient and the associated direction of the gradient.

An illustrated example of a color gradient and corresponding direction is shown in FIG. 6. As shown in FIG. 6, approximation image 520 may be rendered based on a single linear color gradient. In this example, selecting module 114 selected approximation sectors 308 and 304 from FIG. 5 to serve as the basis for the color gradient in FIG. 6. Color gradients generally have directions, indicated in the example of FIG. 6 by gradient direction 620. For example, a color gradient may flow from brown to blue. Furthermore, gradients generally have regions of specified color, sometimes referred to as "stops" or "color stops." A color stop of a gradient allows instructions to define the color of a gradient at specific locations within the gradient. In the example of the linear gradient illustrated in FIG. 6, there is a brown color stop at the start of the gradient and a light blue stop at the end of the gradient. While the two color stops in this example are positioned at the extreme ends of the linear gradient, complex gradients may include any number of color stops positioned in any suitable arrangement throughout the gradient. For example, color stops may be positioned such that each stop is near the center of the approximation sector that served as the basis for that particular color stop.

In some embodiments, selecting module 114 may select multiple gradients and corresponding directions for those gradients. For example, selecting module 114 may select a color gradient and direction of that gradient for each approximation sector in approximation sectors 122. As a specific example of this embodiment, the systems and methods described herein may divide original image 120 based on the layout shown in FIG. 3, and calculate representative colors for each approximation sector. Selecting module 114 may the select color-to-transparent gradients for each approximation sector in approximation sectors 122, and select directions for each gradient based on the position of the approximation sector within the layout. As will be described in greater detail below, these gradients may later be combined and/or blended to provide a visual approximation of original image 120.

When selecting a color gradient for a particular approximation sector, selecting module 114 may select the color gradient based on the representative colors of adjacent approximation sectors. For example, and with reference to FIG. 3, selecting module 114 may select a gradient for approximation sector 302 based on the representative color of approximation sectors 304, 306, and 308 in addition to the representative color of approximation sector 302.

Furthermore, selecting module 114 may select more than one gradient for a particular approximation sector in order to ensure that an approximation image formed out of the gradients is properly representative of the original image. For example, selecting module 114 may select three gradients for approximation sector 302. Specifically, selecting module 114 may select a gradient between approximation sectors 302 and 304, a second gradient between approximation sectors 302 and 306, and a third gradient between approximation sectors 302 and 308. Selecting module 114 may select directions for each of these gradients such that the selected gradient for a given pair of approximation sectors flows between those two approximation sectors. For example, a gradient between approximation sectors 302 and 304 may be a horizontal linear gradient that occupies the upper half of the approximation image, while a gradient between approximation sectors 302 and 306 may be a radial gradient or a sector of a radial gradient that is centered within approximation sector 306.

Figure 7:
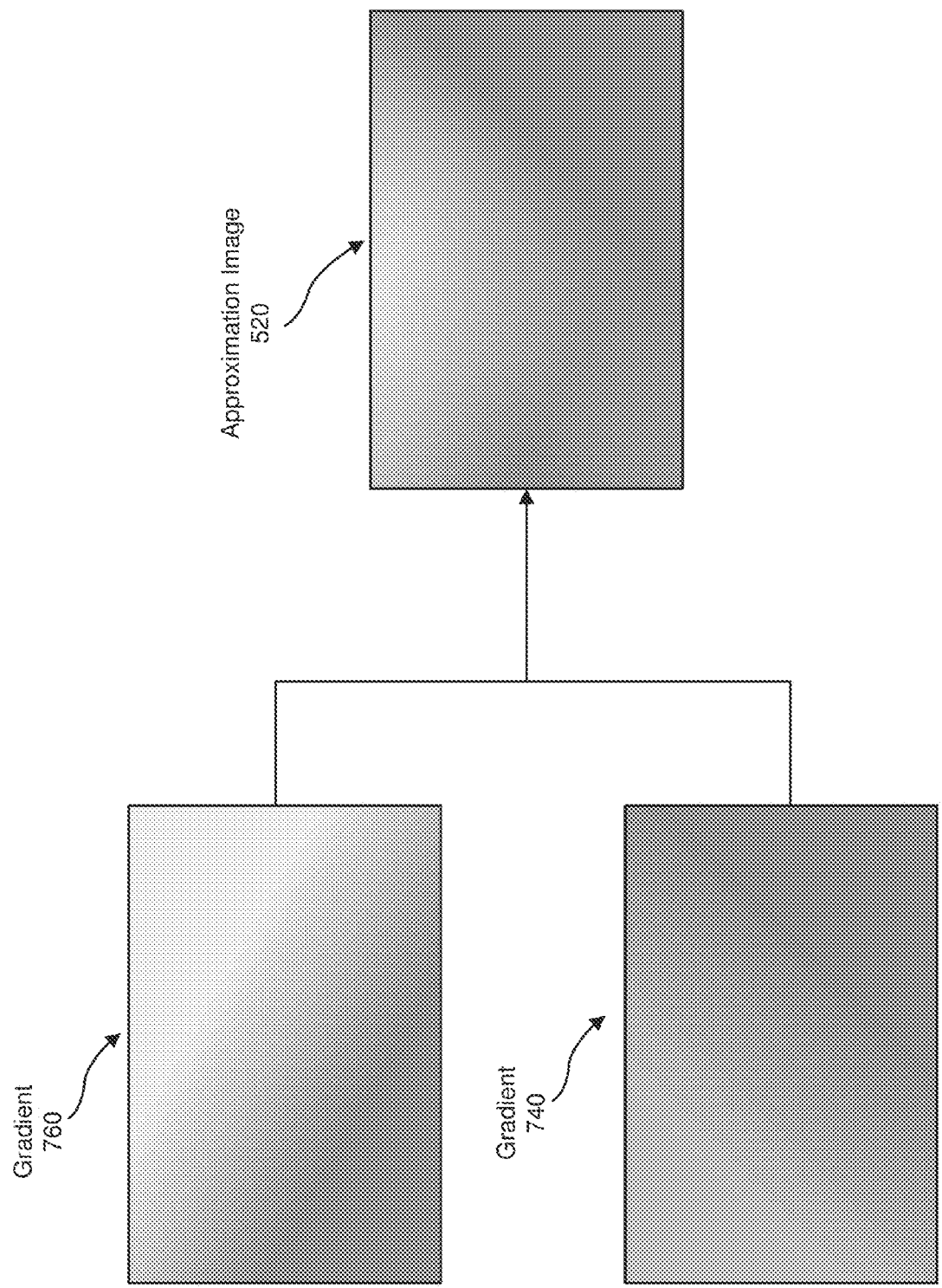
FIG. 7 is a schematic diagram showing an example blending of two gradients to form an approximation image.

An example of blending two gradients is illustrated in FIG. 7. One color gradient, gradient 760, is based on approximation sectors 308 and 304 from FIG. 5, resulting in a brown-to-blue gradient that flows from the lower left corner of the approximation image to the upper right corner. Similarly, gradient 740 may be based on approximation sectors 302 and 310 from FIG. 5, resulting in a green-to-brown gradient that flows from the upper left corner to the lower right corner. Selecting module 114 may blend these gradients together in any suitable way, such as layering the gradients, applying a pixel interpolation algorithm, or any other suitable method of blending two gradients together. As a specific example, selecting module 114 may generate instructions that overlay gradient 740 on top of gradient 760 by increasing the transparency of gradient 740. Blending gradients 760 and 740 in this manner may yield approximation image 520, which may be a better visual approximation of original image 120 than either gradient 760 or gradient 740 taken in isolation.

As described briefly above, different selected gradients may have different shapes depending on the layout of the relevant approximation sectors, the calculated representative colors of those approximation sectors, etc. Selecting module 114 may account for these factors by selecting differently shaped gradients in different contexts. Examples of gradient shapes include, without limitation, linear gradients, radial gradients, repeating linear gradients (i.e., a linear gradient that shifts from one color to a second color, and back again on a repeating basis), and/or repeating radial gradients. As a specific example and with returning reference to FIG. 3, selecting module 114 may select a linear gradient between approximation sectors 302 and 304, but select a radial gradient to occupy approximation sector 306. Similarly, in embodiments where selecting module 114 selects only a single gradient to represent original image 120, selecting module 114 may select and position a linear or radial gradient depending on the representative colors of each approximation sector. As a specific example, selecting module 114 may determine that approximation sectors 302, 304, 308, and 310 represent dark blue regions of original image 120, while approximation sector 306 represents a light blue region of original image 120. Selecting module 114 may accordingly select a radial gradient centered on approximation sector 306 that flows from light blue at the center to dark blue at the periphery. By selecting shaped gradients in this manner, selecting module 114 may provide approximation images that are sufficiently similar to the original image to capture and maintain user attention.

At step 240 in FIG. 2, the method may include providing, to an endpoint computing device and based on the selected color gradients and the direction of the selected color gradients, instructions that enable the endpoint computing device to render, prior to displaying the original image, the visual approximation of the original image. For example, providing module 116 may, based on color gradients 126 and gradient directions 128, provide instructions 130 to an endpoint computing device. Instructions 130 may enable the endpoint computing device to render, prior to displaying original image 120, the visual approximation of original image 120.

In general, providing module 116 may generate computer-executable instructions based on color gradients 126 and gradient directions 128. In some embodiments, instructions 130 may be computer-executable instructions written in a markup language such as HTML or CSS, as described above. Instructions 130 may then be inserted into the markup of a web page for use as a placeholder while an endpoint computing device loads original image 120. In some embodiments, instructions 130 may simply be incorporated into the markup for a webpage or other form of visual content delivery. Additionally or alternatively, instructions 130 may be retrieved by a script incorporated into a webpage or other form of visual content delivery and dynamically inserted into the final markup parsed by software (e.g., a web browser such as GOOGLE CHROME or MOZILLA FIREFOX) installed on an endpoint computing device.

In some embodiments, instructions 130 are provided to the endpoint computing device in response to a network request for the original image. As described above, these instructions may enable the endpoint computing device to render the visual approximation of the original image before displaying the original image. In addition, the same set of instructions may also enable the endpoint computing device to display the original image after receiving the original image. This arrangement may allow a backend system to provide both the instructions for loading the original image as well as the instructions for rendering the approximation image in response to a single network request on the part of the endpoint computing device. For example, the instructions may include CSS code embedded within HTML provided to the endpoint computing device. An example of such embedded code written as HTML and CSS computer-executable instructions is shown below in Table 1. This sample code is provided merely as an example for discussion purposes and is not intended to encompass the many ways in which CSS embedding may be applied to combine image retrieval/display with rendering a background gradient.

TABLE 1

Example Computer-Executable Instructions

```
<!DOCTYPE html>
<html>
<body>
    <img src = "/content/img/sample.jpg" style =
"background: linear-gradient(to bottom, black 0%, white 100%);">
</body>
</html>
```

As shown in the example of Table 1, the instructions provide software on an endpoint computing device, such as a browser, with directions to retrieve and display an image ("sample.jpg"). The instructions also include instructions to render a background gradient that flows from the top of the image frame to the bottom of the image frame, with one color stop for black at the start of the gradient (the top of the image in this example) and a second color stop for white at the end of the gradient. The original image will be inserted into the image frame when it is loaded, thereby replacing the approximation image (rendered as a background) with the original image. Accordingly, this single set of instructions may simultaneously enable the endpoint computing device to load the original image as well as render a placeholder approximation image to be displayed while the endpoint computing device loads the original image.

In general, an endpoint computing device may receive instructions 130 prior to loading original image 120. In other words, providing module 116 may provide instructions 130 to an endpoint computing device before providing original image 120 to the endpoint computing device. In these embodiments, the endpoint computing device may require information encoded within instructions 130 to retrieve original image 120. As an example of this embodiment, an endpoint computing device may load a webpage by first loading the source code for the page, then retrieving resources referenced by the page. In other words, the endpoint computing device may receive instructions for the layout, backgrounds, styles, etc. of the page before receiving, loading, and/or retrieving other content. As a specific example, and with returning reference to Table 1, an endpoint computing device may load the webpage described by the sample code shown in Table 1. The code for this page may include instructions regarding an image to be displayed as well as a background (i.e., an approximation image) for the space that will be occupied by that image. The endpoint computing device may thereby be able to render the approximation image prior to the systems and methods described herein providing the original image to the endpoint computing device.

Figure 8:
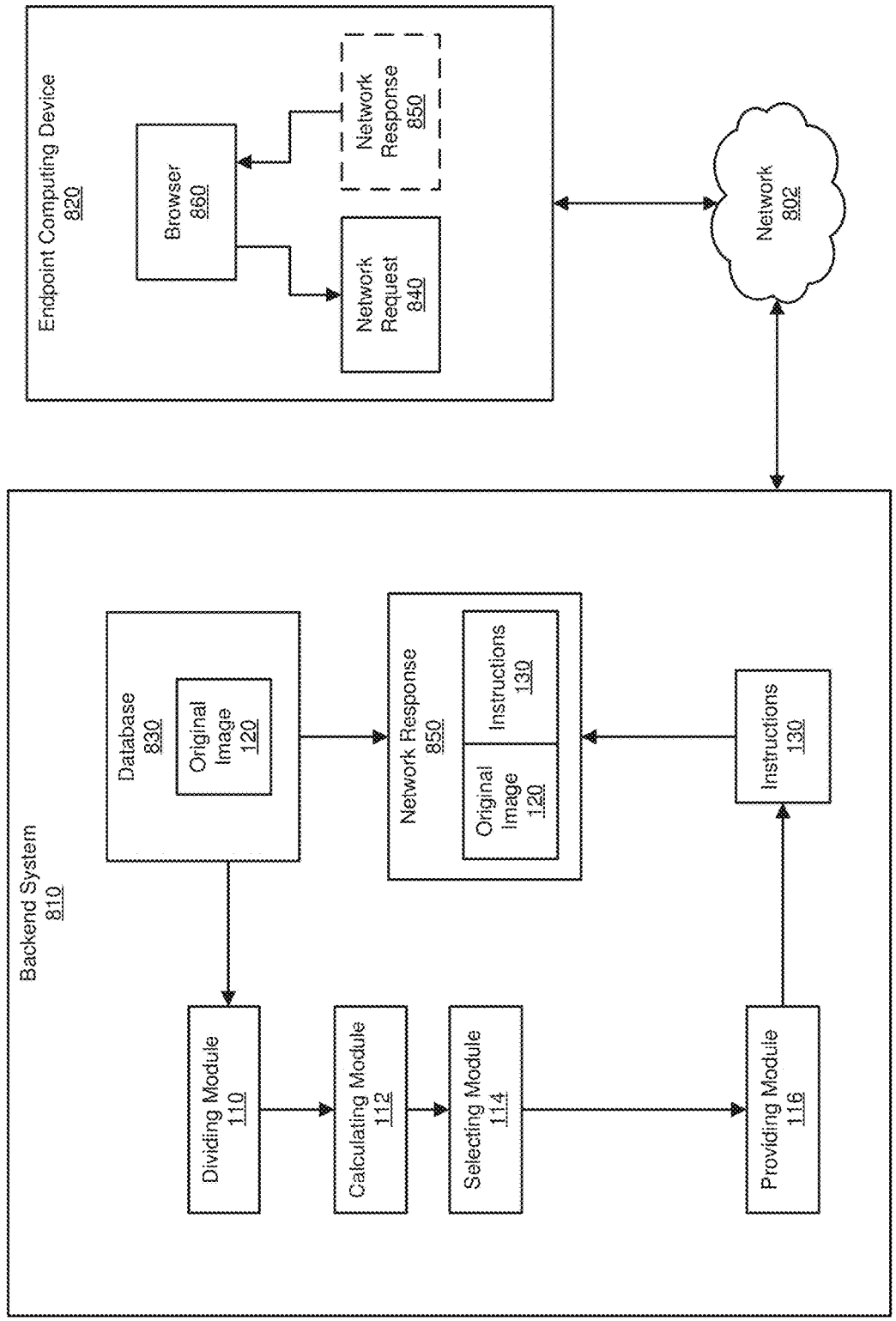
FIG. 8 is a block diagram of an example interaction between an endpoint computing device and a backend system that hosts an image.

An example backend system in communication with an endpoint device is illustrated in FIG. 8. As shown in FIG. 8, a backend system 810 (e.g., a server) may execute dividing module 110, calculating module 112, selecting module 114, and providing module 116. Backend system 810 may also maintain a database 830 that stores a variety of images, including original image 120. As described in greater detail above, these modules may process original image 120 to generate instructions 130 that correspond to original image 120 before receiving a network request for original image 120 to minimize latency in providing instructions 130 to devices that request original image 120.

Backend system 810 may be in communication with an endpoint computing device 820 over a network 802. Network 802 may include, for example, a wireless network, a local area network (LAN), and/or the Internet. Endpoint computing device 820 (e.g., a user's personal computer or mobile phone) may be configured to execute certain software, such as a browser 860. The user may navigate browser 860 to a particular webpage, causing browser 860 to initiate a network request 840 for original image 120. Endpoint computing device 820 may communicate network request 840 to backend system 810 over network 802. Backend system 810 may respond to network request 840 by providing network response 850 to endpoint computing device 820. Network response 850 may contain instructions 130. A separate component of network response 850 may contain original image 120, thus allowing endpoint computing device 820 to execute instructions 130 prior to completely loading original image 120. Instructions 130 may then enable browser 860 to render a visual approximation of original image 120 while browser 860 loads original image 120.

As described above, instructions 130 may be statically or dynamically inserted into a larger instruction set. As one example embodiment of static insertion, the systems and methods described herein may operate as part of a stand-alone service or application that generates instructions for rendering approximation images. A private individual who maintains, for example, a personal blog may provide various photos and other visual material as inputs to this service or application to generate placeholder images for the visual material. The service may provide the individual with markup code that enables computing devices to render the approximation image, and the individual may then incorporate instructions 130 into the code for their webpages.

As a specific example of dynamic content delivery, an online advertisement may display an image as part of the advertisement. The advertising content provider may wish to display preview images while the ad image is loading. Accordingly, the content provider may write their ad frame so that the ad frame retrieves, from a database that stores ad images together with instructions for rendering corresponding approximation images, both the image to be displayed as well as inserting the instructions so that software that displays the ad frame is able to render and display the approximation image while the ad image loads.

In some embodiments, dividing module 110, calculating module 112, and selecting module 114 may process an original image into selected color gradients in anticipation of an end user requesting the image. For example, the systems and methods described herein may execute on a backend content provision system that hosts images for various websites (e.g., backend system 810 in FIG. 8). As an additional example, the systems and methods described herein may execute as part of a search engine that indexes a searchable catalogue of images. Regardless of the exact embodiment, these modules may generate instructions necessary to render an approximation image prior to receiving a request for the original image. The instruction set used to render the approximation image may be stored in a database for dynamic insertion (e.g., through a Hypertext Preprocessor (PHP) script or other form of dynamic content generation) into any webpage or network communication that provides the original image to a user, thereby enabling the user's computing device to render the approximation image while the original image loads. In some embodiments, this instruction set may be stored in direct association with the original image, allowing both the original image and the instruction set for rendering the approximation image to be readily retrieved. By generating the instruction set ahead of time, the systems and methods described herein may thereby be able to provide the instructions to endpoint computing devices with minimal delay.

Figure 9:
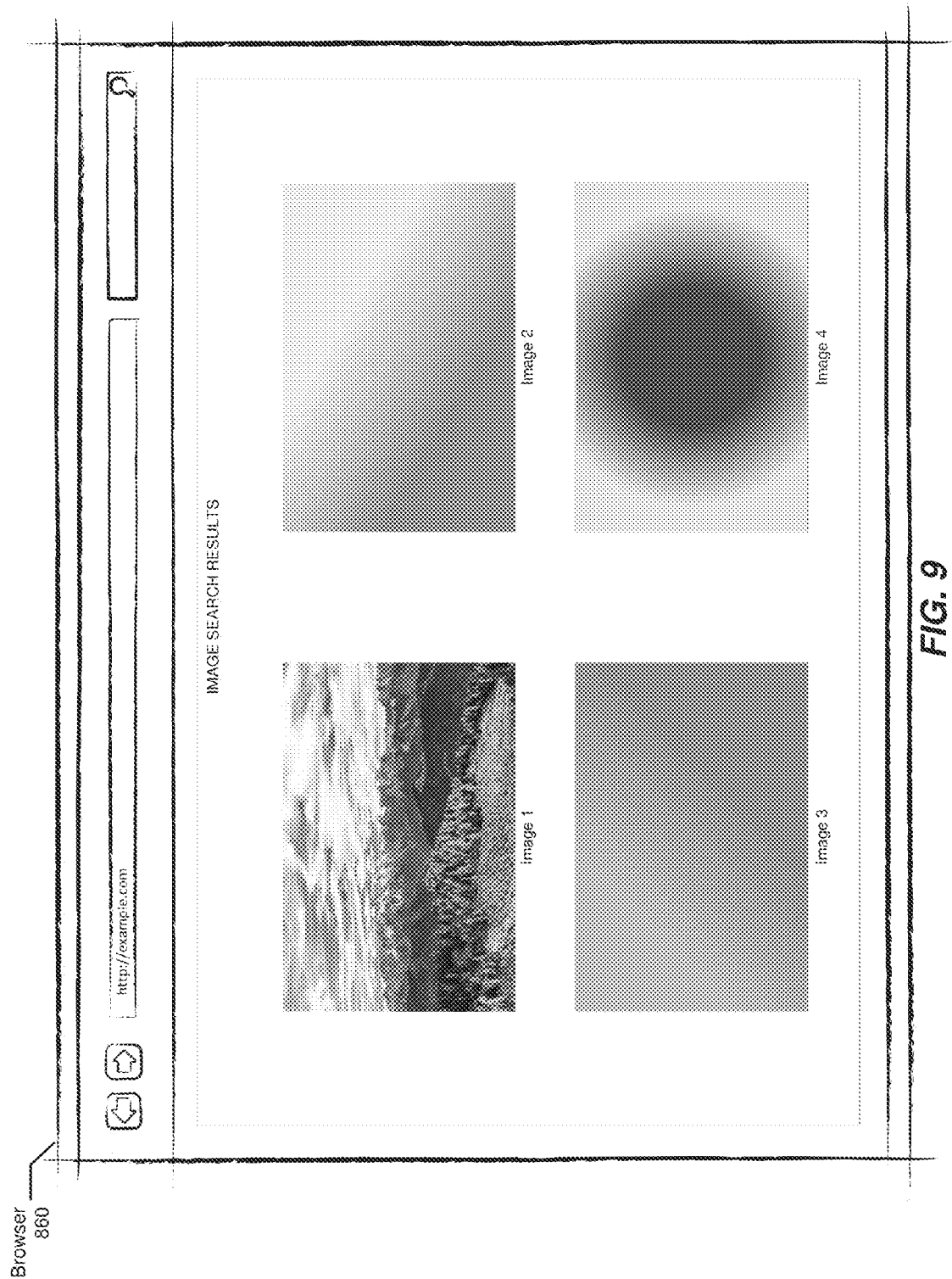
FIG. 9 is a schematic diagram of an example browser window displaying an image that has been loaded in conjunction with approximation images for images that have not been loaded.

An illustrated example of a browser using instructions 130 to render an approximation image is shown in FIG. 9. In FIG. 9, browser 860 may have navigated to a particular website, "http://example.com." As part of loading content for this website, browser 860 may have received instructions from backend system 810 to display four different images, labeled as "Image 1," "Image 2," "Image 3," and "Image 4." However, only Image 1 has completed loading. Accordingly, browser 860 displays the original image for Image 1. Meanwhile, Images 2, 3, and 4 have not finished loading and are thus represented by various gradients derived from the embedded instructions for rendering the visual approximations associated with those images. As described above, the instructions may provide descriptions of various gradients to be used in rendering the visual approximations of the images. In the example of Image 2, the resulting gradient is a linear two-color gradient from brown to blue. Image 3 is represented by a radial gradient centered in the upper left corner that flows from green to brown. Image 4 is a radial gradient centered on the center of the image that flows from dark teal to pale green. By rendering an approximation image using instructions 130 in this way, browser 860 may thereby be able to provide visual placeholders for images to provide context for users that more detailed content is still being loaded and will be displayed once loaded.

As may be appreciated, browser 860 may display the original Images 2, 3, and 4 as they are loaded in place of their respective visual approximations. In some examples, browser 860 may be capable of progressively rendering images as image data is received. Accordingly, in some examples, browser 860 may, for each image, first display an approximation image rendered with gradients (e.g., before any portion of the corresponding image file is received or before a threshold amount of the corresponding image file is received), then display a progressive rendering of the image, and finally display the original image (e.g., once the entire corresponding image file has been received and decoded). In some examples, browser 860 may display, in transition, a hybrid of the approximation image rendered with gradients and a progressive rendering of the image. For example, if a partial progressive rendering of the image leaves blank areas, browser 860 may continue to display the gradient-based approximation image in the blank areas until colors for the blank areas are determined in the progressive rendering process. Additionally or alternatively, colors indicated by the progressive rendering process may be weighted with colors indicated by the gradient to generate a composite placeholder image. In these examples, as the progressive rendering of the image advances (and thus more precisely and/or accurately represents the image), colors indicated by the progressive rendering process may be weighted more heavily while colors indicated by the gradient-based approximation image may be weighted less heavily (until, e.g., only the progressively rendered image data is used).

As described in greater detail above, the systems and methods described herein may enable various software applications to render visual approximations of images while waiting for the actual intended image to load. For example, a backend content delivery system may embed CSS instructions in code that displays images served by the backend content delivery system. Because these instructions require significantly less bandwidth than image data, and indeed are used to properly load and display an image, the embedded CSS instructions may enable browsers and other software to draw gradients in the space that will be occupied by the image before the image has loaded. By providing users with these visual approximations, the systems and methods described herein may thereby enable various websites and other content delivery systems to provide users with a visual indicator that more content is on the way, thus increasing user interest and engagement with the actual content once the actual content has loaded.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive an original image to be transformed, divide the original image into approximation sectors, transform the pixel data in each approximation sector into a representative color for the corresponding approximation sector, transform the layout of approximation sectors and representative colors into one or more gradients, compile the gradients into a visual approximation of the original image, and provide an endpoint computing device with computer-executable instructions on how to render the visual approximation. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   dividing an original digital image into a plurality of approximation sectors;
   calculating a representative color for each approximation sector in the plurality of approximation sectors;
   selecting, based on the representative color of each approximation sector in the plurality of approximation sectors, at least one color gradient and a direction of the at least one color gradient, wherein the at least one color gradient forms a visual approximation of the original digital image; and providing, to an endpoint computing device and based on the at least one color gradient and the direction of the at least one color gradient, instructions that enable the endpoint computing device to render, prior to displaying the original digital image, the visual approximation of the original digital image as a representative placeholder image for the original digital image.

2. The method of claim 1, wherein the instructions comprise computer-executable instructions written in a markup language.

3. The method of claim 1, wherein the instructions comprise a single set of computer-executable instructions that:
are provided to the endpoint computing device in response to a network request for the original digital image; and
enable the endpoint computing device both to render the visual approximation of the original digital image before displaying the original digital image and to display the original digital image after receiving the original digital image.

4. The method of claim 1, wherein calculating the representative color for each approximation sector comprises processing the original digital image with a color quantization algorithm.

5. The method of claim 1, wherein selecting the at least one color gradient and the direction of the at least one color gradient comprises selecting, for each approximation sector in the plurality of approximation sectors, a corresponding color gradient and a corresponding direction of the corresponding color gradient.

6. The method of claim 5, wherein selecting the corresponding color gradient for each approximation sector comprises selecting the corresponding color gradient based at least in part on the representative color of an adjacent approximation sector.

7. The method of claim 1, wherein dividing the original digital image into the plurality of approximation sectors comprises dividing the original digital image according to a predetermined layout of approximation sectors.

8. The method of claim 1, wherein dividing the original digital image into the plurality of approximation sectors comprises:
performing a visual analysis of the original digital image to identify key regions of the original digital image; and
dividing the original digital image into the plurality of approximation sectors based on the identified key regions of the original digital image.

9. The method of claim 1 wherein:
at least two color gradients are selected; and
providing the instructions to the endpoint computing device comprises providing instructions that describe a blending pattern that combines the at least two color gradients.

10. The method of claim 1, wherein selecting the direction of the at least one color gradient further comprises selecting a shape of the color gradient.

11. The method of claim 10, wherein the shape of the color gradient comprises at least one of:
a linear gradient;
a radial gradient;
a repeating linear gradient; or
a repeating radial gradient.

12. The method of claim 1, wherein providing the instructions comprises providing the instructions to the endpoint computing device prior to providing the original digital image to the endpoint computing device.

13. The method of claim 1, wherein selecting the at least one color gradient and the direction of the at least one color gradient comprises selecting the at least one color gradient based on a pair of approximation sectors selected from the plurality of approximation sectors.

14. The method of claim 13, further comprising selecting the pair of approximation sectors based on a calculated difference between the representative color of each approximation sector in the plurality of approximation sectors.

15. A system comprising:
a dividing module, stored in a memory of the system, that divides an original digital image into a plurality of approximation sectors;
a calculating module, stored in the memory, that calculates a representative color for each approximation sector in the plurality of approximation sectors;
a selecting module, stored in the memory, that selects, based on the representative color of each approximation sector in the plurality of approximation sectors, at least one color gradient and a direction of the at least one color gradient, wherein the at least one color gradient forms a visual approximation of the original digital image;
a providing module, stored in the memory, that provides, to an endpoint computing device and based on the at least one color gradient and the direction of the at least one color gradient, instructions that enable the endpoint computing device to render, prior to displaying the original digital image, the visual approximation of the original digital image as a representative placeholder image for the original digital image; and
at least one physical processor configured to execute the dividing module, the calculating module, the selecting module, and the providing module.

16. The system of claim 15, wherein the instructions comprise computer-executable instructions written in a markup language.

17. The system of claim 15, wherein the instructions comprise a single set of computer-executable instructions that:
are provided to the endpoint computing device in response to a network request for the original digital image; and
enable the endpoint computing device both to render the visual approximation of the original digital image before displaying the original digital image and to display the original digital image after receiving the original digital image.

18. The system of claim 15, wherein the calculating module applies a color quantization algorithm to the original digital image.

19. The system of claim 15, wherein the selecting module selects, for each approximation sector in the plurality of approximation sectors, a corresponding color gradient and a corresponding direction of the corresponding color gradient.

20. A non-transitory computer-readable medium comprising one or more computer-readable instructions that, when executed by at least one processor of a computing device, cause the computing device to:
divide an original digital image into a plurality of approximation sectors;
calculate a representative color for each approximation sector in the plurality of approximation sectors;
select, based on the representative color of each approximation sector in the plurality of approximation sectors, at least one color gradient and a direction of the at least one color gradient, wherein the at least one color gradient forms a visual approximation of the original digital image; and provide, to an endpoint computing device and based on the at least one color gradient and the direction of the at least one color gradient, instructions that enable the endpoint computing device to render, prior to displaying the original digital image, the visual approximation of the original digital image as a representative placeholder image for the original digital image.

* * * * *